US012608533B2

(12) United States Patent
Schneyer et al.

(10) Patent No.: US 12,608,533 B2
(45) Date of Patent: Apr. 21, 2026

(54) DOCUMENT EDITOR AND FILE FORMAT

(71) Applicant: Filevine, Inc., Salt Lake City, UT (US)

(72) Inventors: Evan Schneyer, Brooklyn, NY (US);
Daniel Dalzotto, Brooklyn, NY (US);
Keven Bouchard, Boischatel (CA);
Ryan Anderson, Salt Lake City, UT
(US)

(73) Assignee: Filevine, Inc., Salt Lake City, UT (US)

( * ) Notice: Subject to any disclaimer, the term of this
patent is extended or adjusted under 35
U.S.C. 154(b) by 354 days.

(21) Appl. No.: 17/823,183

(22) Filed: Aug. 30, 2022

(65) Prior Publication Data

US 2024/0070379 A1 Feb. 29, 2024

(51) Int. Cl.
*G06F 40/143* (2020.01)
*G06F 40/103* (2020.01)
*G06F 40/166* (2020.01)

(52) U.S. Cl.
CPC .......... *G06F 40/143* (2020.01); *G06F 40/103*
(2020.01); *G06F 40/166* (2020.01)

(58) Field of Classification Search
CPC ..... G06F 40/143; G06F 40/103; G06F 40/166
See application file for complete search history.

(56) References Cited

U.S. PATENT DOCUMENTS

| | | | | |
|---|---|---|---|---|
| 6,507,858 | B1 * | 1/2003 | Kanerva ................. | G06F 16/93 |
| | | | | 715/234 |
| 2002/0065848 | A1 * | 5/2002 | Walker ................ | G06F 21/6209 |
| | | | | 715/255 |
| 2014/0244707 | A1 * | 8/2014 | Kluin .................. | H04L 67/1095 |
| | | | | 709/201 |
| 2019/0392178 | A1 * | 12/2019 | Rice ...................... | H04L 9/3247 |
| 2021/0141990 | A1 | 5/2021 | Dykema | |

OTHER PUBLICATIONS

International Searching Authority, International Search Report and
the Written Opinion, Mar. 13, 2024.

* cited by examiner

*Primary Examiner* — Keith D Bloomquist
(74) *Attorney, Agent, or Firm* — Kirton McConkie; Brian
Tucker

(57) ABSTRACT

A document editor is configured to leverage a file format
which defines sections of content in a dynamic tree structure.
The dynamic tree structure defines sections in an arbitrarily
ordered sequence of sibling nodes where each section may
be atomic. Using this dynamic tree structure, the document
editor can dynamically render the content of the sections and
provide a number of enhanced functions to simplify the
drafting and management of legal documents.

20 Claims, 16 Drawing Sheets

Figure 2B:
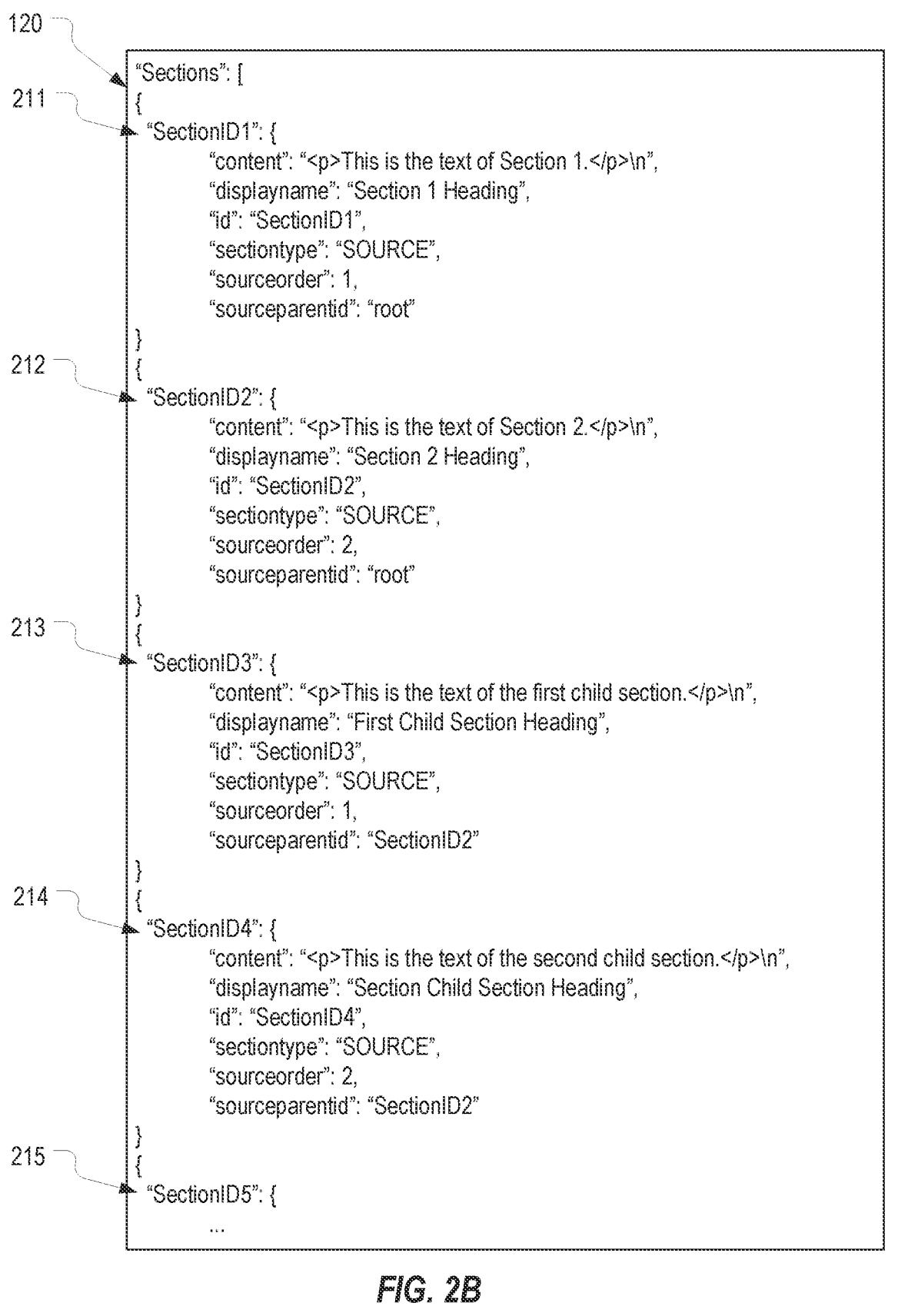

120

211

212

213

214

215

"Sections": [
{
    "SectionID1": {
            "content": "<p>This is the text of Section 1.</p>\n",
            "displayname": "Section 1 Heading",
            "id": "SectionID1",
            "sectiontype": "SOURCE",
            "sourceorder": 1,
            "sourceparentid": "root"
}
{
    "SectionID2": {
            "content": "<p>This is the text of Section 2.</p>\n",
            "displayname": "Section 2 Heading",
            "id": "SectionID2",
            "sectiontype": "SOURCE",
            "sourceorder": 2,
            "sourceparentid": "root"
}
{
    "SectionID3": {
            "content": "<p>This is the text of the first child section.</p>\n",
            "displayname": "First Child Section Heading",
            "id": "SectionID3",
            "sectiontype": "SOURCE",
            "sourceorder": 1,
            "sourceparentid": "SectionID2"
}
{
    "SectionID4": {
            "content": "<p>This is the text of the second child section.</p>\n",
            "displayname": "Section Child Section Heading",
            "id": "SectionID4",
            "sectiontype": "SOURCE",
            "sourceorder": 2,
            "sourceparentid": "SectionID2"
}
{
    "SectionID5": {
            ...

Figure 3B:
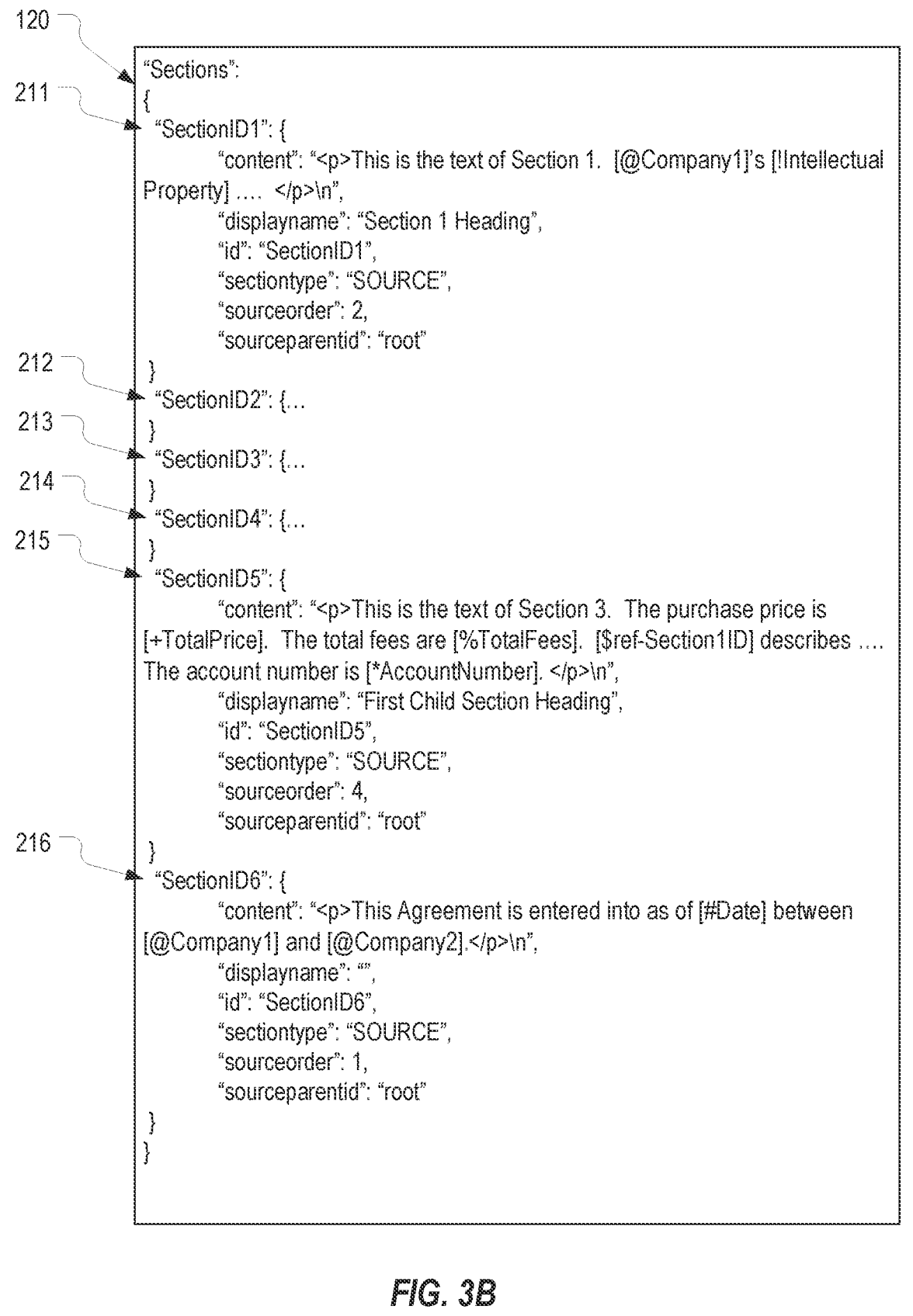

```
"Sections":
{
    "SectionID1": {
            "content": "<p>This is the text of Section 1.  [@Company1]'s [!Intellectual
Property] .... </p>\n",
            "displayname": "Section 1 Heading",
            "id": "SectionID1",
            "sectiontype": "SOURCE",
            "sourceorder": 2,
            "sourceparentid": "root"
    }
    "SectionID2": {...
    }
    "SectionID3": {...
    }
    "SectionID4": {...
    }
    "SectionID5": {
            "content": "<p>This is the text of Section 3.  The purchase price is
[+TotalPrice].  The total fees are [%TotalFees].  [$ref-Section1ID] describes ....
The account number is [*AccountNumber]. </p>\n",
            "displayname": "First Child Section Heading",
            "id": "SectionID5",
            "sectiontype": "SOURCE",
            "sourceorder": 4,
            "sourceparentid": "root"
    }
    "SectionID6": {
            "content": "<p>This Agreement is entered into as of [#Date] between
[@Company1] and [@Company2].</p>\n",
            "displayname": "",
            "id": "SectionID6",
            "sectiontype": "SOURCE",
            "sourceorder": 1,
            "sourceparentid": "root"
    }
}
```

Figure 3C:
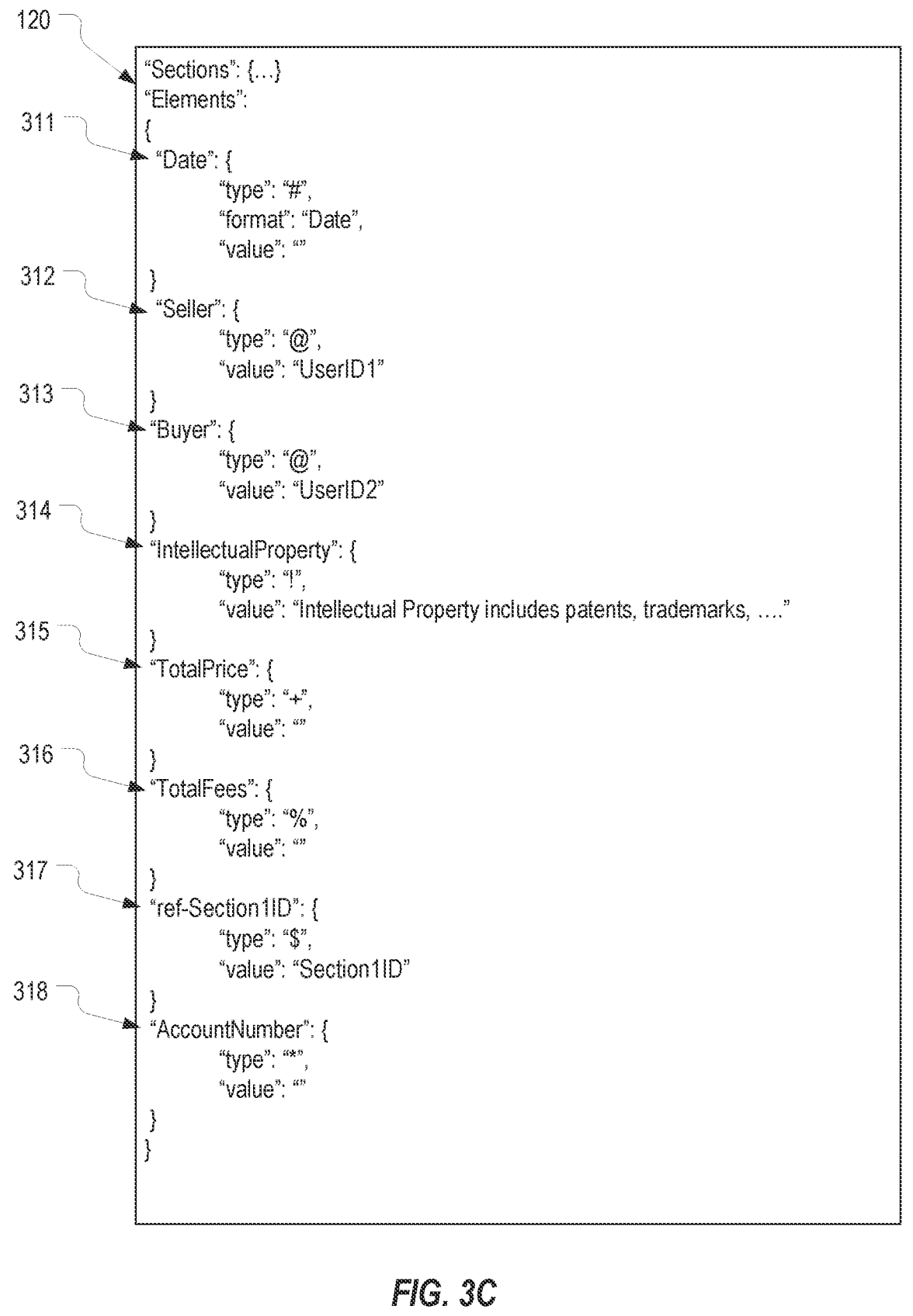

```
"Sections": {...}
"Elements":
{
    "Date": {
            "type": "#",
            "format": "Date",
            "value": ""
    }
    "Seller": {
            "type": "@",
            "value": "UserID1"
    }
    "Buyer": {
            "type": "@",
            "value": "UserID2"
    }
    "IntellectualProperty": {
            "type": "!",
            "value": "Intellectual Property includes patents, trademarks, ...."
    }
    "TotalPrice": {
            "type": "+",
            "value": ""
    }
    "TotalFees": {
            "type": "%",
            "value": ""
    }
    "ref-Section1ID": {
            "type": "$",
            "value": "Section1ID"
    }
    "AccountNumber": {
            "type": "*",
            "value": ""
    }
}
}
```

311 — "Date"
312 — "Seller"
313 — "Buyer"
314 — "IntellectualProperty"
315 — "TotalPrice"
316 — "TotalFees"
317 — "ref-Section1ID"
318 — "AccountNumber"

```
"Sections": {...}
"Elements": {...}
"Users":
{
  "UserID1": {
          "email": "...",
          "fullName": "...",
          "inviteStatus": "accepted",
          "key": "...",
          "org: "...",
          "partyID": "Buyer",
          "role": "owner",
          "title": "CEO",
          "uid": "UserID1"
  }
  {
  "UserID2": {
          "email": "...",
          "fullName": "...",
          "inviteStatus": "accepted",
          "key": "...",
          "org: "...",
          "partyID": "Seller",
          "role": "owner",
          "title": "CEO",
          "uid": "UserID2"
  }
          ...
}
```

```
"Sections":
{
  "SectionID1": {
        "content": "<p>This is the text of Section 1.  [@Company1]'s [!Intellectual
Property] ....  </p>\n",
        "displayname": "Section 1 Heading",
        "id": "SectionID1",
        "sectiontype": "SOURCE",
        "sourceorder": 2,
        "sourceparentid": "root",
        "versions": {
                "versionID1": {
                        "content": "<p>This is the text of Section 1.
[@Company1]'s [!Intellectual Property] ....  Seller warrants that ....</p>\n",
                        ...
                }
        }
}
  "SectionID2": {...
}
  "SectionID3": {...
}
  "SectionID4": {...
}
  "SectionID5": {...
}
  "SectionID6": {...
}
}
```

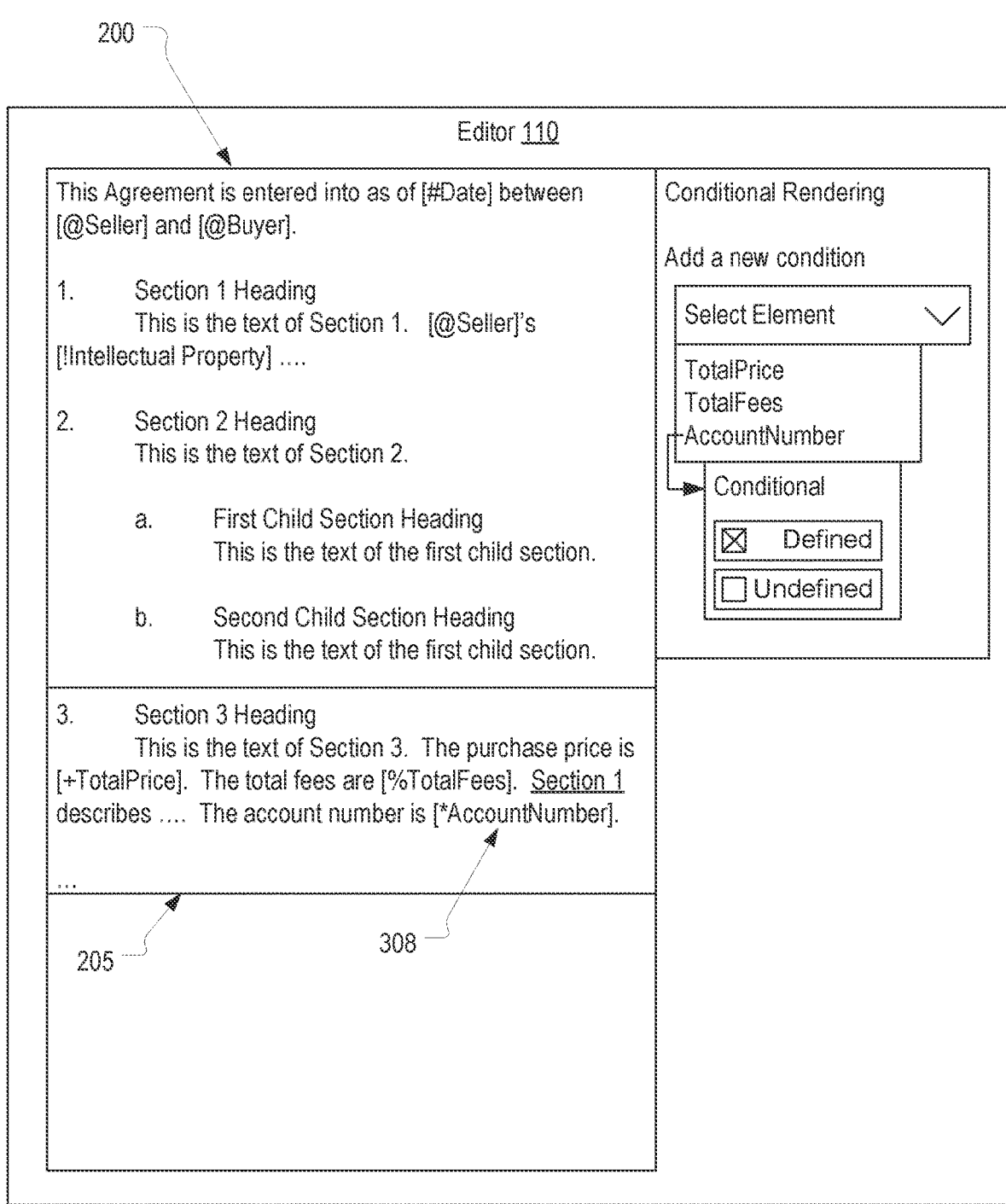

Editor 110

This Agreement is entered into as of [#Date] between [@Seller] and [@Buyer].

1.    Section 1 Heading
      This is the text of Section 1.   [@Seller]'s [!Intellectual Property] ....

2.    Section 2 Heading
      This is the text of Section 2.

a.    First Child Section Heading
            This is the text of the first child section.

b.    Second Child Section Heading
            This is the text of the first child section.

3.    Section 3 Heading
      This is the text of Section 3.  The purchase price is [+TotalPrice].  The total fees are [%TotalFees].  Section 1 describes ....  The account number is [*AccountNumber].

...

Conditional Rendering

Add a new condition

Select Element ⌄

TotalPrice
TotalFees
AccountNumber

Conditional
☒  Defined
☐ Undefined

Editor 110

This Agreement is entered into as of [#Date] between [@Seller] and [@Buyer].

1.    Section 1 Heading
      This is the text of Section 1.   [@Seller]'s [!Intellectual Property] ....

2.    Section 2 Heading
      This is the text of Section 2.

a.    First Child Section Heading
            This is the text of the first child section.

b.    Second Child Section Heading
            This is the text of the first child section.

...

200

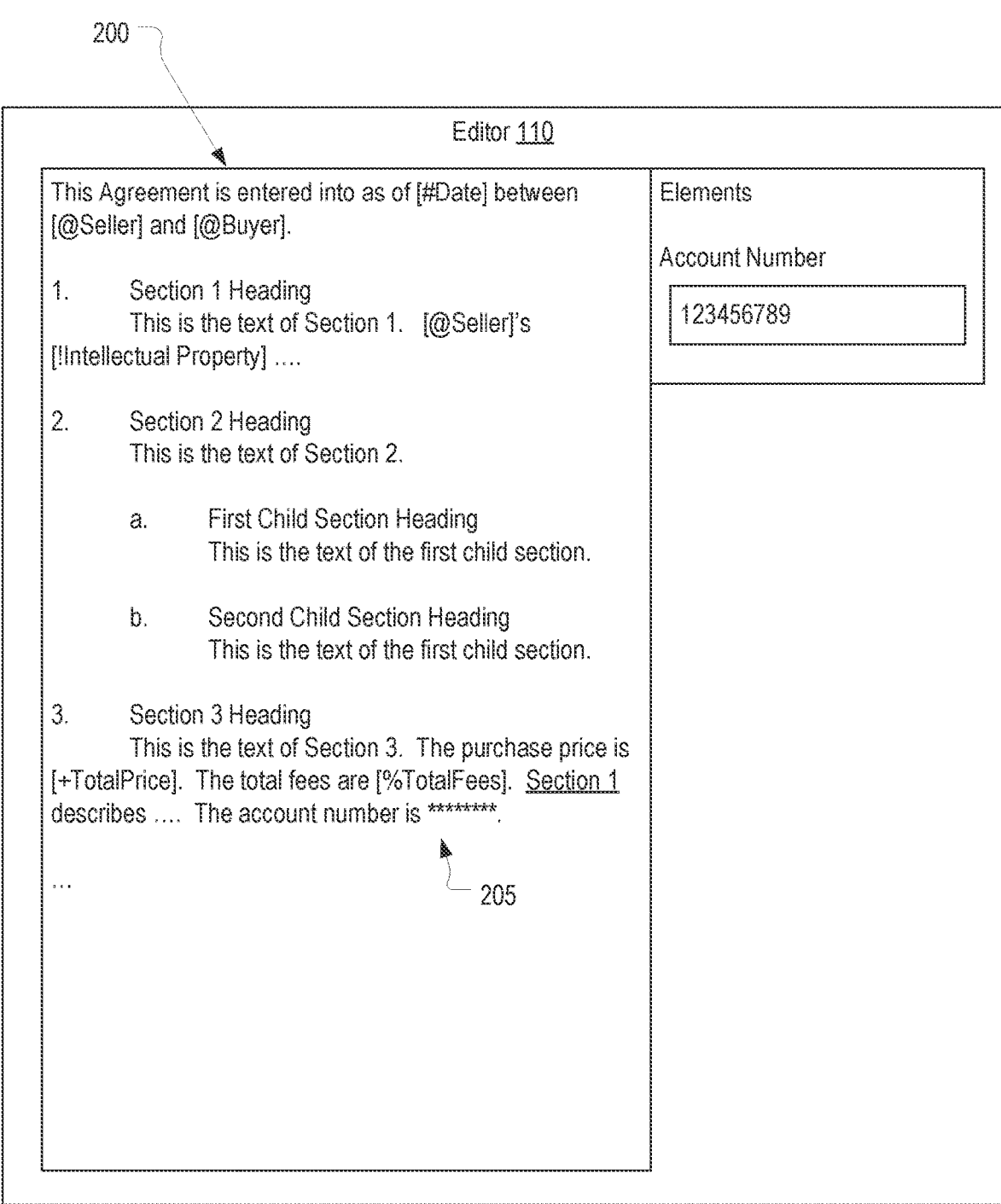

Editor 110

This Agreement is entered into as of [#Date] between [@Seller] and [@Buyer].

1.      Section 1 Heading
        This is the text of Section 1.   [@Seller]'s [!Intellectual Property] ....

2.      Section 2 Heading
        This is the text of Section 2.

a.      First Child Section Heading
                This is the text of the first child section.

b.      Second Child Section Heading
                This is the text of the first child section.

3.      Section 3 Heading
        This is the text of Section 3.  The purchase price is [+TotalPrice].  The total fees are [%TotalFees].  Section 1 describes ....  The account number is ********.

...

205

Elements

Account Number

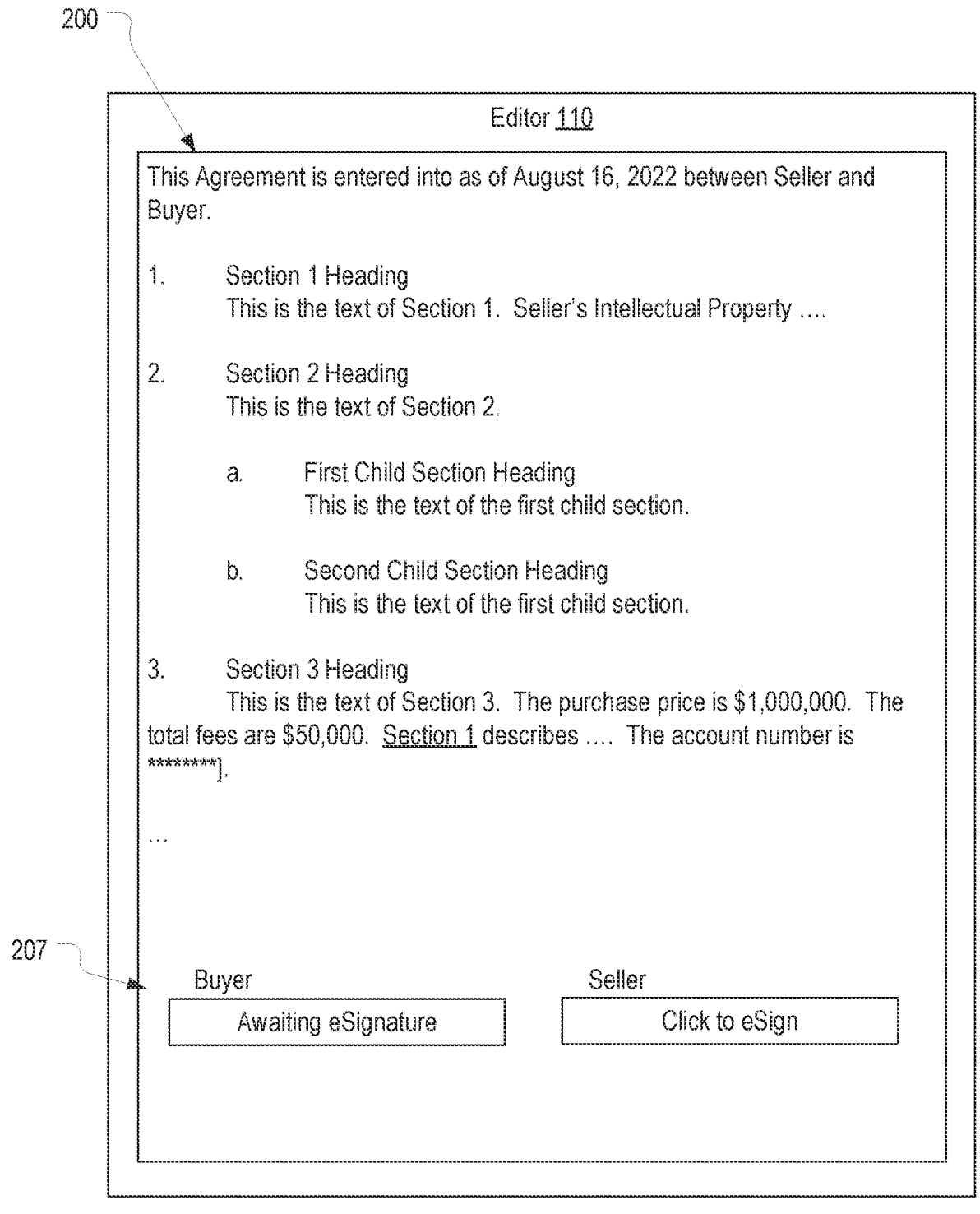

Editor <u>110</u>

This Agreement is entered into as of August 16, 2022 between Seller and Buyer.

1.     Section 1 Heading
    This is the text of Section 1.  Seller's Intellectual Property ....

2.     Section 2 Heading
    This is the text of Section 2.

a.     First Child Section Heading
       This is the text of the first child section.

b.     Second Child Section Heading
       This is the text of the first child section.

3.     Section 3 Heading
    This is the text of Section 3.  The purchase price is $1,000,000.  The total fees are $50,000.  <u>Section 1</u> describes ....  The account number is ********].

...

207

Buyer
| Awaiting eSignature |

Seller
| Click to eSign |

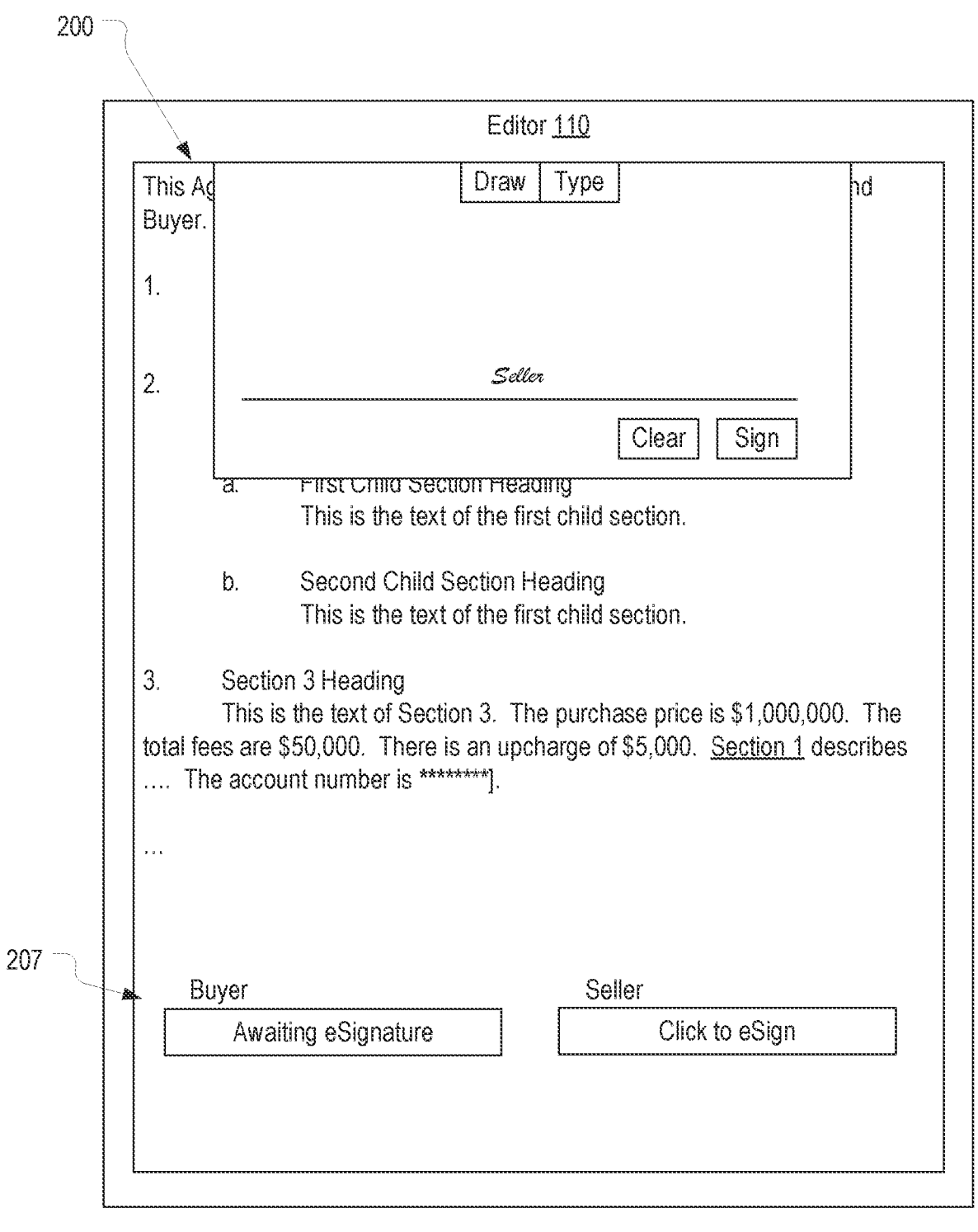

Editor 110

This A[ ]d
Buyer.

| Draw | Type |

1.

2.

*Seller*

| Clear | Sign | a.     First Child Section Heading
This is the text of the first child section.

b.     Second Child Section Heading
This is the text of the first child section.

3.     Section 3 Heading
This is the text of Section 3.  The purchase price is $1,000,000.  The total fees are $50,000.  There is an upcharge of $5,000.  Section 1 describes .... The account number is ********].

...

207

Buyer                                    Seller
| Awaiting eSignature |          | Click to eSign |

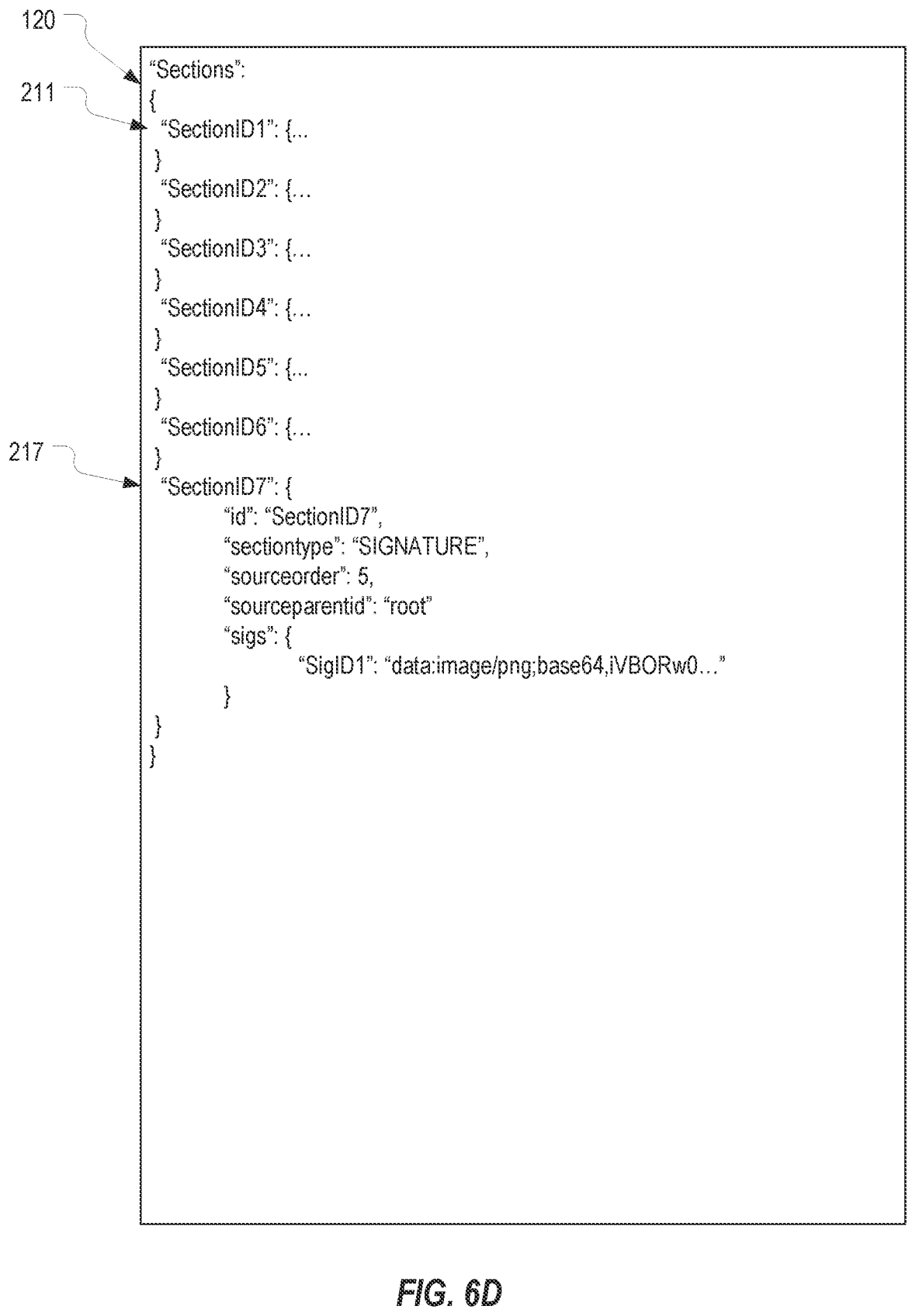

"Sections":
{
  "SectionID1": {...
  }
  "SectionID2": {...
  }
  "SectionID3": {...
  }
  "SectionID4": {...
  }
  "SectionID5": {...
  }
  "SectionID6": {...
  }
  "SectionID7": {
        "id": "SectionID7",
        "sectiontype": "SIGNATURE",
        "sourceorder": 5,
        "sourceparentid": "root"
        "sigs": {
                "SigID1": "data:image/png;base64,iVBORw0..."
        }
  }
}

*FIG. 6D*

DOCUMENT EDITOR AND FILE FORMAT

CROSS-REFERENCE TO RELATED APPLICATIONS

N/A

BACKGROUND

Various document editors exist with Microsoft Word being the most common. Such document editors may use an XML-based file format to organize the content of a document. For example, the .docx format that current versions of Microsoft Word use is part of the Microsoft Office Open XML specification. The .docx format and other similar formats allow the content of the document to be structured. However, many limitations still exist particularly when using a document editor to draft and revise legal documents.

BRIEF SUMMARY

The present invention extends to systems, methods, and computer program products for implementing a document editor and file format. The document editor is configured to leverage a file format which defines sections of content in a dynamic tree structure. The dynamic tree structure defines sections in an arbitrarily ordered sequence of sibling nodes where each section may be atomic. Using this dynamic tree structure, the document editor can dynamically render the content of the sections and provide a number of enhanced functions to simplify the drafting and management of legal documents.

In some embodiments, the present invention may be implemented by a document editor as a method for defining a document. The document editor may present a document that is associated with a file. The document editor may receive first input that creates a first document section within the document. In response to receiving the first input, the document editor may create a first file section within a sections data structure in the file. The document editor may also receive second input that creates a second document section within the document. In response to receiving the second input, the document editor may create a second file section within the sections data.

In some embodiments, the first and second file sections may each include an order property that defines an order of the first and second document sections within the document.

In some embodiments, the document editor may detect that the first document section has been moved within the document relative to the second document section and may update the order property in the first and second file sections to define a new order of the first and second document sections within the document.

In some embodiments, the document editor may receive third input that creates a third document section within the document. The third document section may be a child of the first document section. In response to receiving the third input, the document editor may create a third file section within the sections data structure in the file. The third file section may include a parent property that references the first file section as a parent of the third file section.

In some embodiments, the document editor may detect that the third document section has been moved within the document to no longer be the child of the first document section and may update the parent property in the third file section to no longer reference the first file section as the parent of the third file section.

In some embodiments, updating the parent property in the third file section to no longer reference the first file section as the parent of the third file section may include updating the parent property in the third file section to reference a root section as the parent of the third file section in conjunction with setting the order property in the third file section to define an order of the third file section relative to the first and second file sections.

In some embodiments, in conjunction with setting the order property in the third file section to define the order of the third file section relative to the first and second file sections, the document editor may update the order property in one or both of the first and second file sections.

In some embodiments, the first and second file sections may each include a content property that defines textual content of the first and second document sections respectively.

In some embodiments, the first and second documents sections may be paragraphs.

In some embodiments, the document editor may detect that the content of the first document section includes a first element and may update an elements data structure in the file to include a first element member that defines the first element, the elements data structure being separate from the sections data structure.

In some embodiments, the first element member may be defined in the elements data structure as having a type and the type may be one of a variable element, a party element, a term element, a connected element, a calculated element, a reference element, or a secret element.

In some embodiments, the document editor may detect that a value for the first element member has not been defined and may prevent an esignature from being input to the document.

In some embodiments, the document editor may detect that a value of an element member does not meet one or more conditions required for including the first document section and may prevent the first document section from being rendered in the document.

In some embodiments, the document editor may detect that the content of the first document section includes redlines and may prevent an esignature from being input to the document.

In some embodiments, the second document section may be a signature block that includes esignature fields and the document editor may detect that a first esignature has been input to a first signature field of the signature fields and may store internally within the file a text-based representation of the first esignature's binary image data.

In some embodiments, the present invention may be implemented as computer storage media storing computer executable instructions which when executed implement a document editor that is configured to perform a method for defining a document. The document editor may access a file that includes a plurality of file sections. Each file section may include an order property that defines an order in which a corresponding document section should be rendered within a document. The document editor may then render a document that includes a plurality of document sections corresponding to the plurality of file sections. The plurality of document sections may be ordered based on the order property defined in each of the plurality of file sections.

In some embodiments, the document editor may detect that a first document section of the plurality of document sections has been moved within the document and may update the order property of a first file section corresponding to the first document section.

In some embodiments, each file section may include a parent property that defines a parent file section for the respective file section. The parent file section may be either a root file section or a different file section of the plurality of file sections.

In some embodiments, the present invention may be implemented by a document editor as a method for managing a document. The document editor may render a document that includes a plurality of document sections. Each document section may be rendered from a corresponding file section defined in a file. A first document section of the plurality of document sections may correspond to a first file section that defines a signature block. The document editor may access an elements data structure in the file. The elements data structure may define a plurality of elements that are included in content of the plurality of document sections. The document editor may detect that one or more elements of the plurality of elements in the elements data structure have not been assigned a value. The document editor may prevent one or more signature fields in the first document section from receiving an esignature until a value has been assigned to the one or more elements.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2B provides an example of how the sections of the document can be stored in a file in accordance with embodiments of the present invention;

FIG. 3B provides an example of how the sections of the document can be updated in the file in response to the addition of the elements in accordance with embodiments of the present invention;

FIG. 3C provides an example of how the elements can be stored in the file in accordance with embodiments of the present invention;

FIG. 3D provides an example of how users can be defined in the file in accordance with embodiments of the present invention;

FIG. 4B provides an example of how a version of the section can be created and stored in the file when the section is edited in accordance with embodiments of the present invention;

FIGS. 5A-5C provide an example of how a document section can be conditionally rendered in accordance with embodiments of the present invention; and FIGS. 6A-6D provide an example of how esignatures may be managed in accordance with embodiments of the present invention.

DETAILED DESCRIPTION

In this specification and the claims, the term "editor" should be construed as software that provides word processing capabilities to end users. An editor configured in accordance with embodiments of the present invention leverages a unique file format to enable enhanced word processing capabilities. Because these enhanced capabilities are particularly suited for creating and drafting legal documents, embodiments of the present invention will be described in the context of a legal document. However, an editor configured in accordance with embodiments of the present invention could be used to create and edit other types of documents. The term "document" should be given its ordinary meaning and may generally be viewed as the content that the end user creates and edits within the editor. The term "file" should be distinguished from a document and represents the underlying structural data that defines the content and how it should be rendered within the editor. In accordance with embodiments of the present invention, an editor can be configured to use files with a unique format that simplifies the process of creating, editing, and otherwise managing legal documents.

Figure 1:
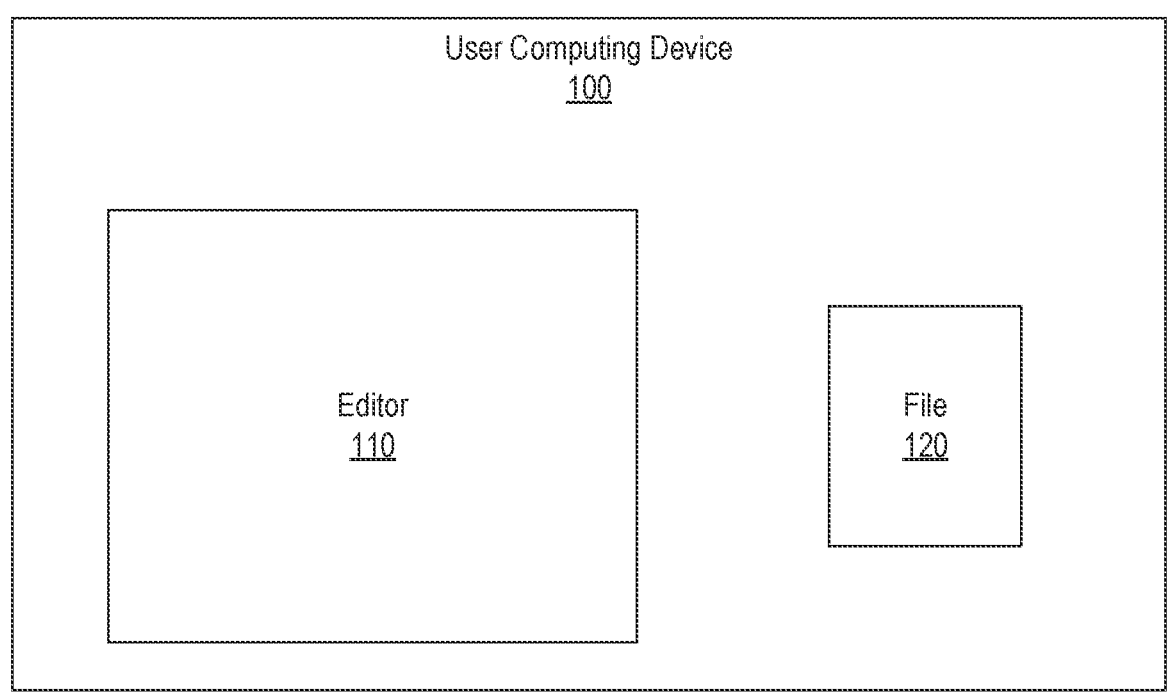
FIG. 1 illustrates an example computing environment in which embodiments of the present invention may be implemented.

FIG. 1 provides an example of a computing environment in which embodiments of the present invention may be implemented. FIG. 1 includes a user computing device 100 which could represent a desktop, a laptop, a tablet, a smart phone, or any other computing device that a user may use to access an editor 110. Editor 110 may be a locally installed application (e.g., a desktop application or mobile application) or may be a browser-based application or other cloud-hosted application. User computing device 100 is also shown as storing a file 120 or otherwise having access to file 120. For example, file 120 could be stored locally on a storage device of user computing device 100, could be stored in a network-accessible location, or could be stored in a cloud storage location. Accordingly, editor 110 and file 120 can be hosted in any suitable way and location.

Figure 2A:
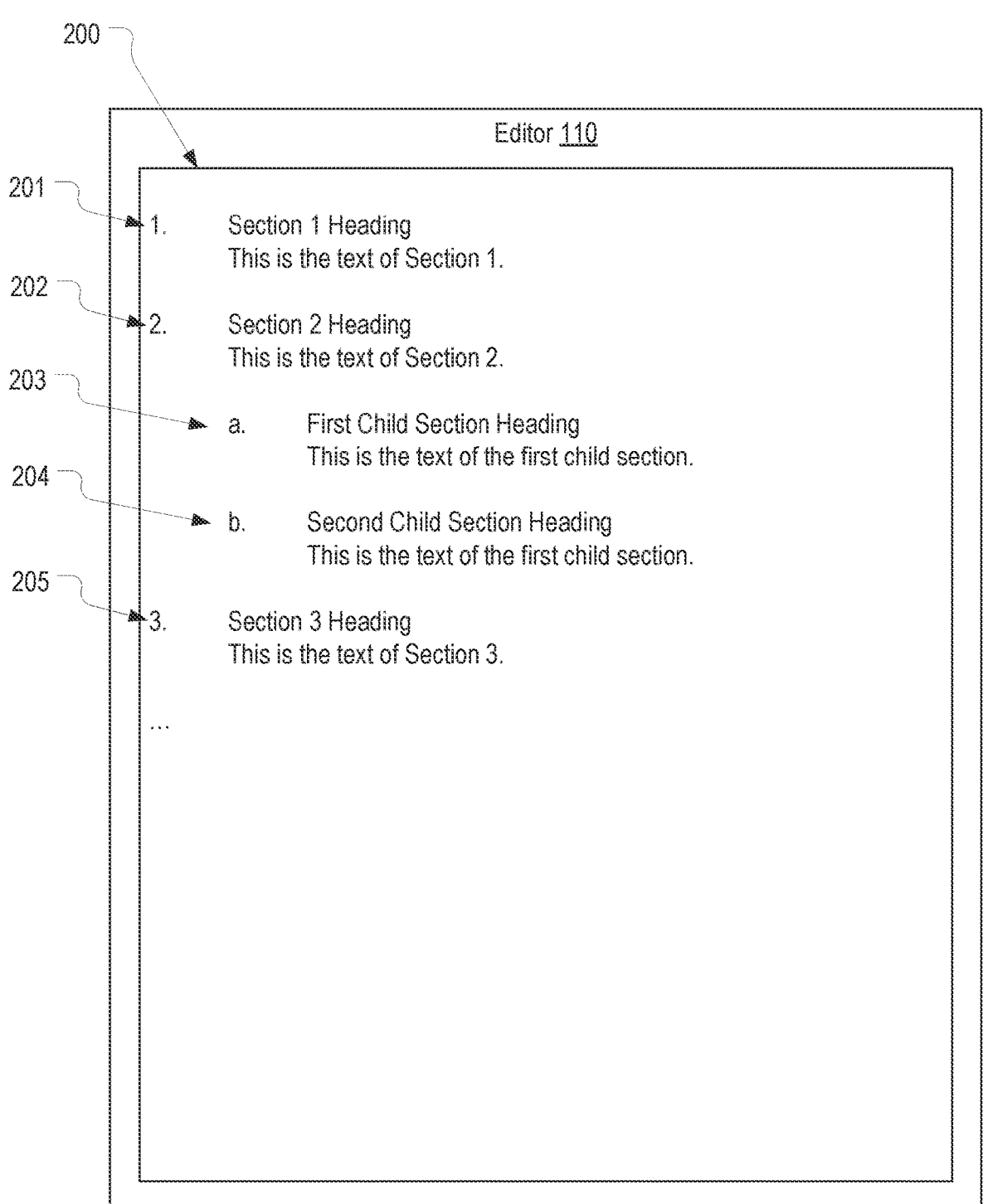
FIG. 2A provides an example of sections of a document that has been created within an editor in accordance with embodiments of the present invention.

FIG. 2A provides an example of how the user could employ editor 110 to create and/or view content of a document 200. In this example, there are five document sections 201-205 within document 200. Typically, a document section may be in the form of a paragraph, but a document section may also be a signature block, a table, a figure, a diagram, an appendix, etc. In the depicted example, each of document sections 201-205 has a heading and a body containing text. Each of document sections 201-205 is also given a numbering (e.g., 1, 2, 2.a, 2.b, and 3) to visually represent each section's hierarchical position within document 200.

FIG. 2B provides an example of how editor 110 may define document sections 201-205 in file 120 using file sections 211-215 respectively. A document section can be considered the rendered representation of a file section. In other words, file sections persist in file 120 but document sections exist only when editor 110 uses file 120 to render and display them. In typical implementations, file 120 can represent an existing template that is repeatedly used to create instances of document 200. However, file 120 could also be created dynamically as the user creates document 200 (e.g., when creating a new agreement from scratch). For purposes of this example, it can be assumed that file 120 as shown in FIG. 2B already existed and that editor 110 accessed file 120 to render document 200 as shown in FIG. 2A.

In this example, file 120 is structured in accordance with JavaScript Object Notation (JSON) but other structured data formats could be used. As shown, file 120 includes a "Sections" array in which each of file sections 211-215 is separately defined in a dynamic tree structure forming an arbitrarily ordered sequence of sibling nodes. In other words, the order in which a file section is defined in the Sections array within file 120 has no bearing on the order in which the corresponding document section appears in document 200. Instead, the file sections defined in file 120 each include properties which allow document sections to be dynamically composed. These properties include an optional content property which defines the content, or prose, if any, that make up the document section in document 200, an optional displayname property which defines the content, if any, of the document section's heading in document 200, an id property which defines a unique identifier, which may be a globally unique identifier, for the file section, a sectiontype property which defines a type of the file section (e.g., paragraph, signature block, appendix, etc.), a sourceorder property which defines the corresponding document section's order within document 200, and a sourceparentid property which defines the file/document section's parent section.

Although not shown, the section array can include an automatically generated root section that represents the top of the file section hierarchy and does not have a corresponding document section (i.e., nothing is displayed in document 200 for the root section). Document sections at the highest level of document 200, such as document sections 201, 202 and 205, are represented in file 120 as children of the root section and therefore file sections 211, 212, and 215 have their sourceparentid property set to root. Document sections 203 and 204 are children of document section 202 in document 200 and therefore file sections 213 and 214 have their sourceparentid property set to the sectionid of file section 212 which is SectionID2.

The sourceorder property is used in conjunction with the sourceparentid property to define the order in which the content of each file section 211-215 should be rendered in document 200. As the user types within document 200 to create or modify document sections 201-205, editor 110 can create and update file sections 211-215 including defining their sourceorder and sourceparentid properties based on how the user positions sections 201-205. Such edits can be performed on each file section 211-215 atomically. For example, if the user moved document section 201 to a new position within document 200, editor 110 need only adjust the sourceorder property and possibly the sourceparentid property in file section 211 and any other impacted file section to define this new position. As a result, the numbering of document sections 201-205 cannot be broken as the user updates or deletes existing document sections or creates new ones given that each document section's numbering is derived from the sourceorder and sourceparentid properties defined in the underlying file sections. A specific example of adjusting these properties is provided below.

Figure 3A:
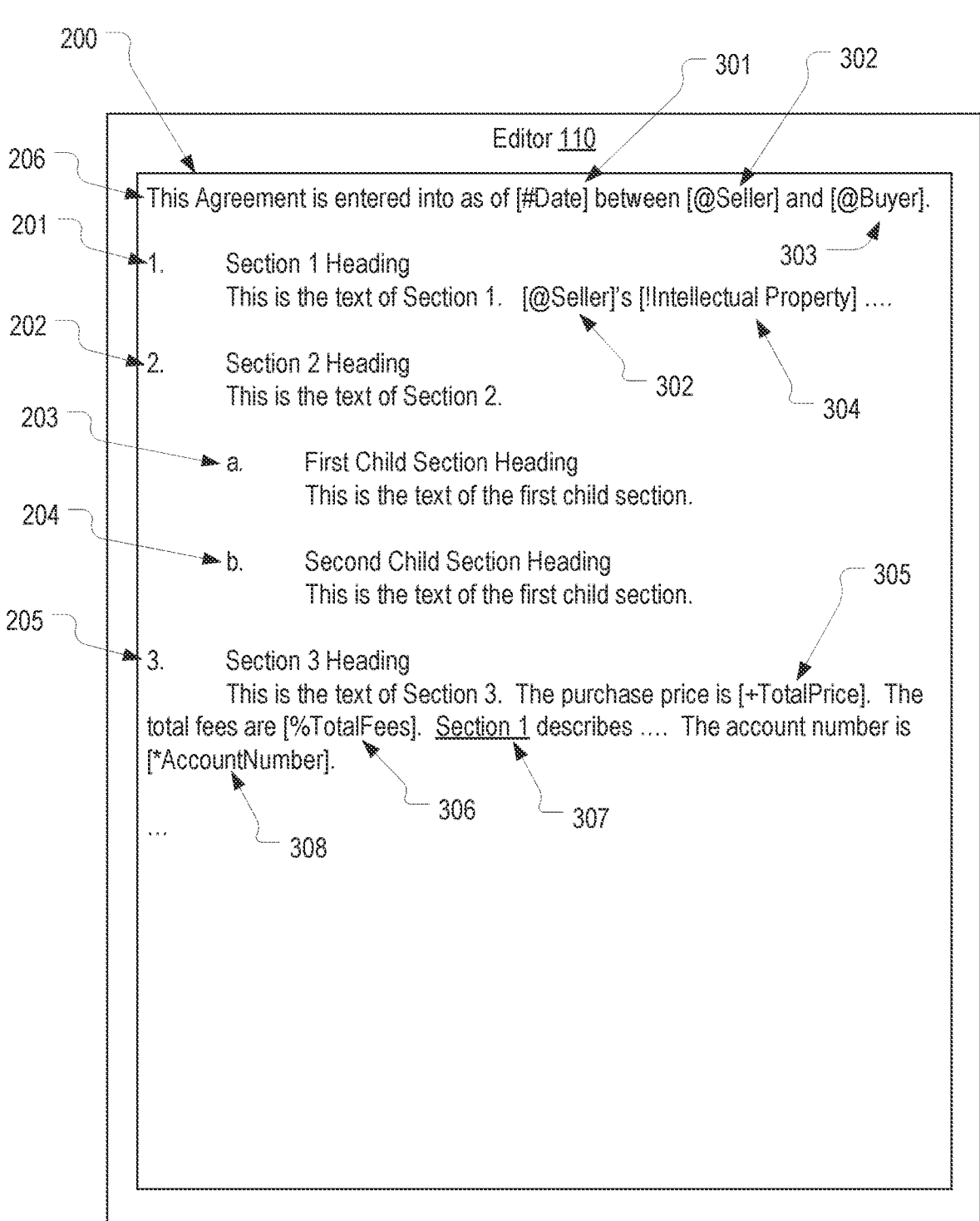
FIG. 3A provides an example of how elements can be included in the document in accordance with embodiments of the present invention.

FIG. 3A provides an example of how elements can be included in document 200, whether during original authoring or reviewing, in accordance with embodiments of the present invention. In legal drafting, it is common to use placeholders, which are typically wrapped in square brackets, to identify pieces of information that need to be filled in. Common examples include [Buyer's Name] or [Total Price].

With traditional editors such as Microsoft Word, these placeholders are routinely overlooked resulting in an executed legal document having missing information. In accordance with embodiments of the present invention, elements can be used to not only function as placeholders but to provide a way to enforce the filling in of the placeholders before completing (e.g., signing) the document.

FIG. 3A is based on FIG. 2A but shows that the user has added a new document section 206 at the beginning of document 200 and has added content to the bodies of document sections 201 and 205. A number of elements 301-307 are included in these additions. As shown, elements can be defined using square brackets.

Element 301 represents a variable type of element which is distinguished using the # symbol before the given name of the variable and is used as a placeholder that must be manually filled in after drafting of document 200. In this example, the variable is a date and could represent the execution date for a legal agreement that document 200 represents.

Elements 302 and 303 represent a party type of element which is distinguished using the @ symbol and is used as a placeholder which can be associated with a defined user object. User objects are separately defined (e.g., via editor 110) and stored in file 120 and may represent a company, an individual, and the like and provide contact information and other similar details for the user. In document 200, element 302 is used to reference the seller and element 303 is used to represent the buyer. Because the user objects for the seller and the buyer are defined separately within file 120, any instance of element 302 or 303 that may appear in document 200 need not be changed when any information about the seller or buyer changes. Instead, editor 110 can populate the information from their respective user objects into each instance of element 302 or 303 at the appropriate time (e.g., upon signing).

Element 304 represents a term type of element which is distinguished using the ! symbol and is used to identify defined terms within document 200. In this case, element 304 represents the term Intellectual Property which may be defined in a different document section from element 304.

Element 305 represents a connected type of element which is distinguished using the + symbol and is used as a placeholder similar to a variable except that a connected element is to be populated from an external source. In this case, element 305 represents a total price and may be intended to be populated from third party software such as Salesforce upon signing of document 200.

Element 306 represents a calculated type of element which is distinguished using the % symbol and is used as a placeholder similar to a variable except that the value of a calculated element is calculated from other elements (e.g., from variables). In this case, element 306 represents total fees due upon signing and may be calculated from the total price and/or other elements.

Element 307 represents a reference type of element which is distinguished using the $ref- symbol and functions as a local reference to document section. As shown in FIG. 3A, editor 110 may replace the [$ref- . . . ] syntax in the document section with an underlined representation of the referenced section to make the reference more readable (e.g., by converting [$ref-Section1ID] with Section 1).

Element 308 represents a secret type of element which is distinguished using the * symbol and is used as a placeholder similar to a variable except that the value assigned to the secret element will be obfuscated in the document section and encrypted in the underlying file section so that only authorized users can view the value via editor 110 including when document 200 is printed, exported, or otherwise made available outside editor 110. In this case, element 308 represents an account number to be filled in after drafting.

FIG. 3B shows how the sections array in file 120 is updated in response to the additions made in FIG. 3A. As shown, a new file section 216 has been created in the sections array. Although document section 206 is the first section in document 200, file section 216 is the last section in the section array. To define that document section 206 should appear first in document 200, the sourceorder property of file section 216 is set to 1 and the sourceparentid property is set to root. Also, because document section 206 is now positioned before document sections 201, 202, and 205, the sourceorder property of file sections 211, 212, and 215 has been incremented by one to reflect their relationship to file section 216. Notably, the sourceorder property of file sections 213 and 214 are not changed because they are at a different level of the file section hierarchy. FIG. 3B also shows how elements 301-308 are defined within the content properties of the respective file sections in which they appear.

FIG. 3C shows how file 120 can include an elements array within which elements 301-308 are defined. As shown, this element array includes element members 311-318 corresponding with elements 301-308. Each of element members 311-318 may define the type of the element and a value, among possibly additional information. In the case of a party element, the value property may define the user ID of a user has been associated with the party element. In the case of a reference element, the value property may define the identifier of the file section that has been associated with the reference element. In the case of a secret element, the value property may be encrypted. Because elements 301-308 are defined in file 120 as element members 311-318 that are separate from the file sections, the value of the elements can be assigned and updated independent of the content in which the elements appear.

FIG. 3D shows how file 120 can include a users array within which users are defined. As shown, the users array includes a user object 321 which defines the buyer and a user object 322 which defines the seller. Each user object includes a user identifier (uid) by which the user object may be referenced by elements such as party elements. Because users are defined in file 120 as user objects that are separate from the file sections, the details for each user can be assigned and updated independent of the content in which such details appear. This provides a single point for defining and updating the user details to avoid inconsistencies that may otherwise occur within document 200.

Figure 4A:
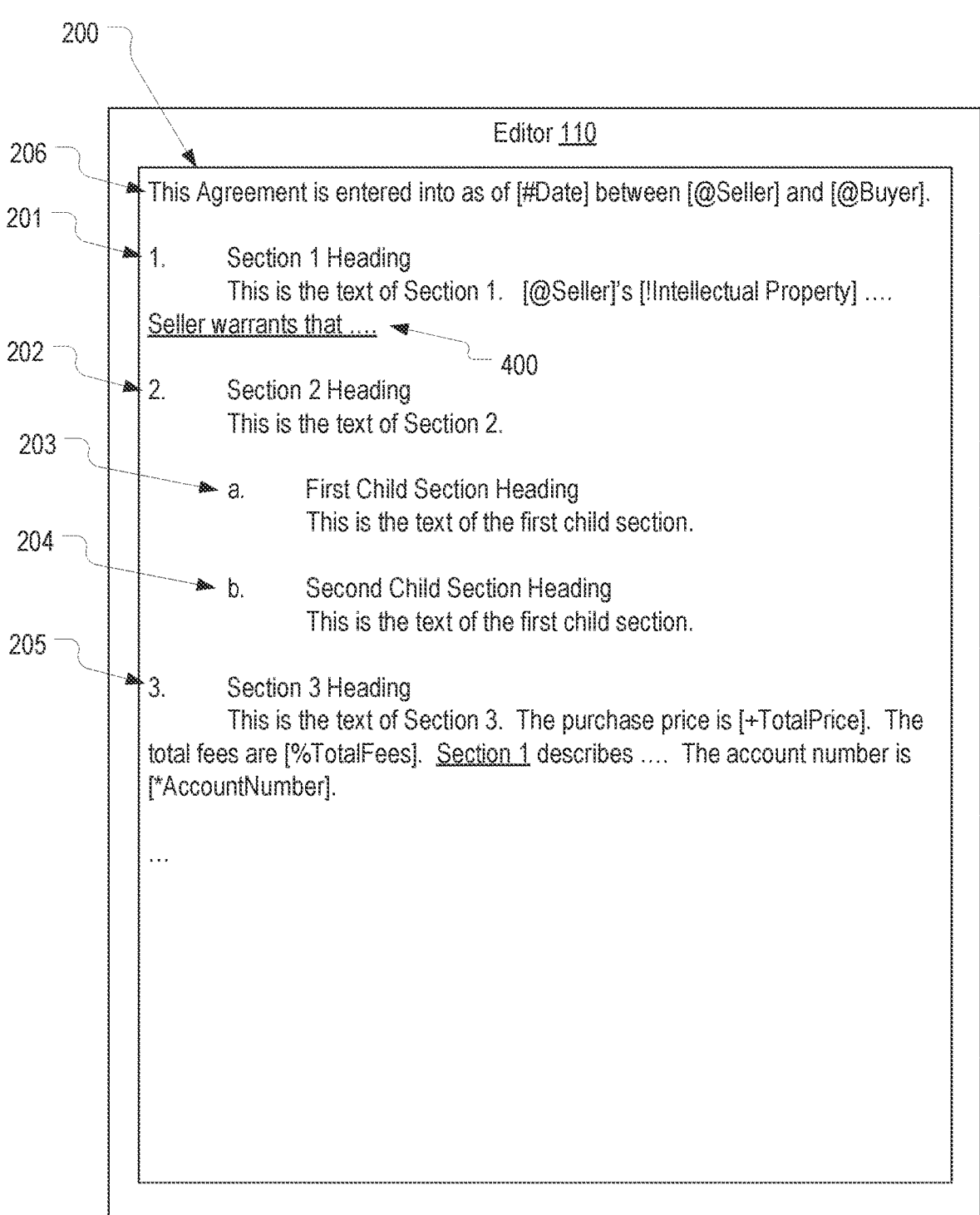
FIG. 4A provides an example of how a section can be edited.

FIG. 4A provides an example of how editor 110 can allow a user to modify the content of a document section. In this example, it is assumed that the user is a reviewer, not the original author, and inserts additional content 400 into document section 201 as part of his or her review. FIG. 4B provides an example of how file 120 can use versions to track modifications to the content of a document section. In FIG. 4B, file section 211 is now shown as including a versions property which is in the form of an array and includes a version member defining the modified version of document section 201. In particular, the version member can resemble the content of file section 211 but the content property of the version member can include the content of document section 201 as modified. Notably, other than the addition of the version member in the version property, file section 211 is unchanged in response to the reviewer adding additional content 400. Each time the content of document section 201 is modified, an additional version member may be created within the version property of file section 211 to define the modified document section. In this way, the history of a particular section can be easily and independently reviewed. Although not shown in this example, if document section 201 were moved within document 200, the version member created from such a modification could include modified sourceorder and/or sourceparentid values to reflect the updated position of document section 201.

Because each document section is defined in file 120 by a separate and independent file section, access control can be implemented on a per document section basis. In some embodiments, each file section may include a permissions property in which access control can be defined specifically for that section. For example, if the author of document 200 wanted to allow an intellectual property attorney to review and edit only document sections pertaining to intellectual property, the author could use editor 110 to define such permissions. Editor 110 could then persist the permissions in the underlying file sections. For example, each file section could have a permissions array in which the users with rights to edit the content of that section can be defined (e.g., by associating the uid assigned to the IP attorney with the file section). Then, when the IP attorney accesses document 200 in editor 110, editor 110 will ensure that he or she can only edit document sections that the underlying file sections permit.

Figure 5B:

Because each document section is defined in file 120 by a separate and independent file section, editor 110 can conditionally render document sections. In other words, a file sections can exist in file 120 but a corresponding document section may only be included in document 200 if a condition is met. FIGS. 5A-5C provide an example of how editor 110 may provide such conditional rendering functionality.

In FIG. 5A, it is assumed that the author of document 200 is manipulating document section 205 and that editor 110 has presented an option to define a condition that defines whether document section 205 should be rendered. In this example, it is assumed that the author has selected element 308, the Account Number, which appears in document section 205 and has indicated that element 308 must be defined for document section 205 to appear in document 200. Other types of conditions include a Boolean condition for an element and a numeric condition for an element.

Turning to FIG. 5B, it is now assumed that a reviewer is using editor 110 to review document 200 and that a value has not been assigned to element 308. Therefore, document section 205 has not been rendered in document 200. However, file section 215 still exists in file 120. In this case, editor 110 determines that the defined condition has not been met and therefore foregoes rendering the content of file section 215 in document 200.

Turning to FIG. 5C, it is now assumed that the reviewer has accessed a menu item of editor 110 which allows the value of elements to be defined and that the reviewer has input a value of 123456789 for element 308. As the reviewer inputs this value, editor 110 can determine that the condition has been met and can retrieve the content of file section 215 and use it to render document section 205 in document 200. Also, now that a value is defined for element 308, editor 110 may replace element 308 with the value. However, because element 308 is a secret element, editor 110 inserts ********* or some other obfuscated representation of the account number.

FIG. 6A provides an example of how a signature block can be represented as a document section 207. Document section 207 includes two signature fields, one for the buyer and one for the seller. Both signature fields are selectable to provide an esignature. In FIG. 6A, all the elements in document 200 have been defined and therefore editor 110 can allow an esignature to be provided. It is assumed that the user in FIG. 6A is the seller and therefore the signature field for the seller prompts the user to "click to eSign."

Figure 6B:
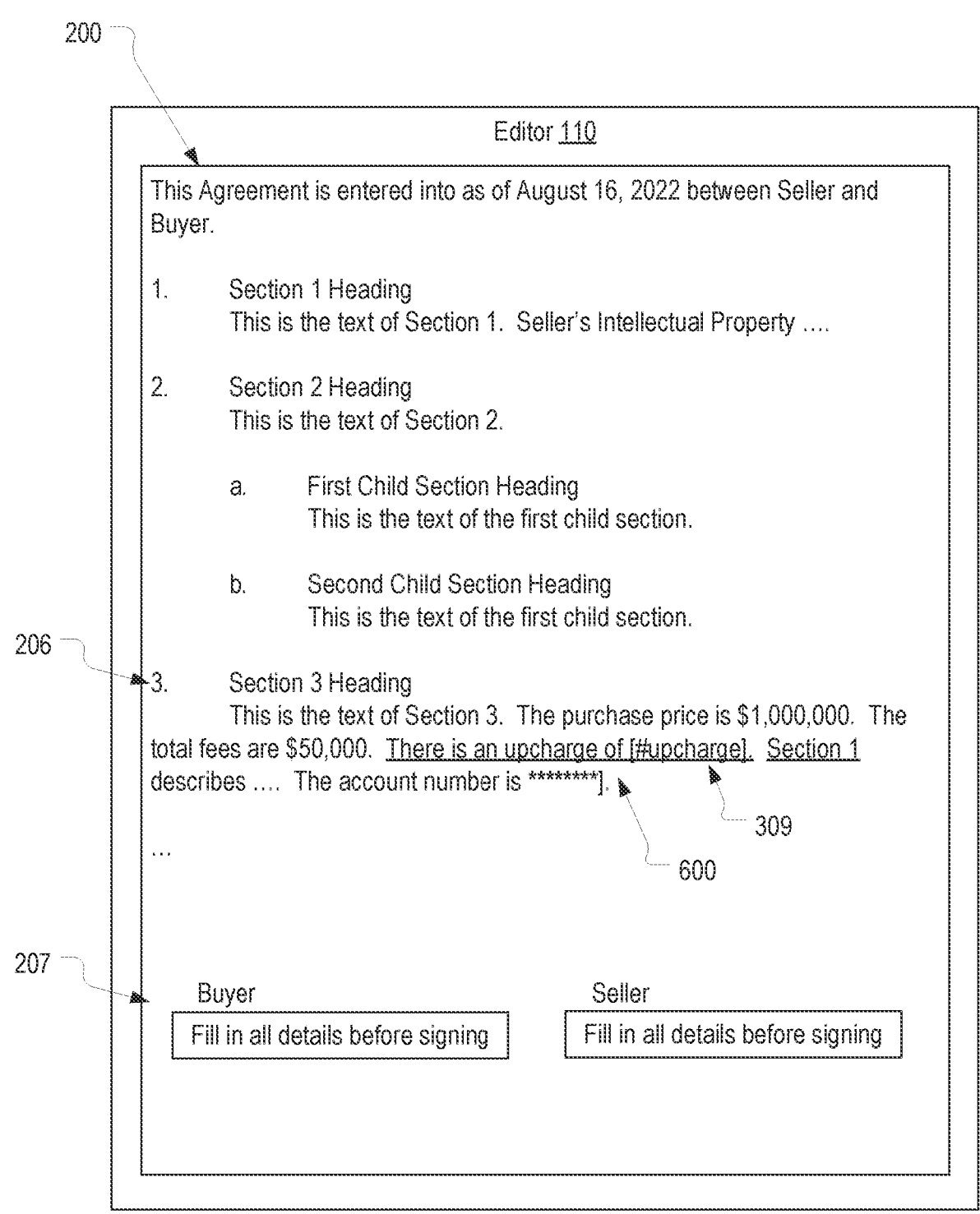

Turning to FIG. 6B, the seller has added a new sentence 600 in document section 206 and new sentence 600 defines a new element 309. However, a value has not been assigned to element 309. Therefore, because not all the elements in document 200 have been defined (or more specifically, because a value has not been assigned to all the elements defined in file 120), editor 110 can prevent signing. For example, in FIG. 6B, editor 110 has updated the signature fields in document section 207 to state "Fill in all details before signing" and to no longer be selectable. In this way, editor 110 ensures that all elements are defined before document 200 can be executed. Editor 110 can also prevent signing if there are unresolved redlines (e.g., until new sentence 600 has been accepted by the buyer).

Turning to FIG. 6C, it is now assumed that a value has been defined for element 309 and therefore editor 110 now allows the seller to sign document 200. It is also assumed that the seller has selected the signature field which has caused editor 110 to present an interface to allow the seller to draw or type his or her signature. Once the seller inputs his or her signature, editor 110 can prevent further editing of other document sections. However, editor 110 may allow editing of file section 217 after partial execution because it is a signature block such as to enable corrections in the signor's details.

Turning to FIG. 6D, in response to the seller submitting his or her signature, editor 110 can update file section 217 corresponding to document section 207 to add a text-based representation of the signature. For example, in FIG. 6D, file section 217 includes a sigs array that now stores a base64 representation for the seller's signature which is associated with a unique id (SigID1) for the signature. Once the buyer signs, editor 110 could update file section 217 by adding a text-based representation of the buyer's signature to the sigs array. In this way, editor 110 embeds each signature directly within file 120 as separate and independent objects.

Because the signatures are embedded as separate objects within file section 217, document 200 can be reverted to a prior state after a signature has been added, provided that document 200 is not yet fully executed. For example, if after signing, the seller discovered that an additional edit needed to be made, the seller could use editor 110 to request removal of his or her signature. Then, editor 110 need only delete the text-based representation of the signature from the sigs array in file section 217 which could revert document 200 back to the state represented in FIG. 6A in which the seller could freely edit document 200. After editing document 200, the seller could then sign in the same manner described above resulting in a new text-based representation of the signature being added to the sigs array in file section 217. In this way, editor 110 can manipulate signatures independent of other file sections in file 120. Once document 200 is fully executed, editor 110 can prevent further edits thereby making document 200 read only.

Editor 110 can also ensure that file 120 complies with industry standards and best practices for the handling of esignatures. For example, in addition to preventing any edits to document 200 after being fully executed, editor 110 may generate and append a digital signature to file 120 once all esignatures have been embedded in file 120 to ensure that the content of file 120 is not altered. Editor 110 can also maintain an audit log that is embedded in file 120 which defines details of the esignatures (as well as all other changes made to file 120).

In summary, an editor configured in accordance with embodiments of the present invention can use a unique file format that facilitates the creation and management of legal documents. This unique file format allows a document's sections to be independently manipulated and facilitates a variety of enhanced functionality.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, JavaScript-based applications, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a document editor, for defining a document, the method comprising:

presenting, within the document editor, a document that is associated with a single structured data file;

receiving first input to the document editor that creates a first document section within the document;

in response to receiving the first input, creating a first file section within a sections data structure in the single structured data file;

receiving second input to the document editor that creates a second document section within the document; and in response to receiving the second input, creating a second file section within the sections data structure in the single structured data file, the second file section being separate from the first file section;

wherein the sections data structure defined in the single structured data file stores file sections in a dynamic tree structure forming an arbitrary ordered sequence of sibling nodes such that the first and second file sections are arbitrarily ordered within the sections data structure of the single structured data file that is associated with the document.

2. The method of claim 1, wherein the first and second file sections each include an order property that defines an order of the first and second document sections within the document.

3. The method of claim 2, further comprising:

detecting that the first document section has been moved within the document relative to the second document section; and updating the order property in the first and second file sections to define a new order of the first and second document sections within the document.

4. The method of claim 2, further comprising:

receiving third input to the document editor that creates a third document section within the document, the third document section being a child of the first document section;

in response to receiving the third input, creating a third file section within the sections data structure in the single structured data file, the third file section including a parent property that references the first file section as a parent of the third file section.

5. The method of claim 4, further comprising:

detecting that the third document section has been moved within the document to no longer be the child of the first document section; and updating the parent property in the third file section to no longer reference the first file section as the parent of the third file section.

6. The method of claim 5, wherein updating the parent property in the third file section to no longer reference the first file section as the parent of the third file section comprises updating the parent property in the third file section to reference a root section as the parent of the third file section in conjunction with setting the order property in the third file section to define an order of the third file section relative to the first and second file sections.

7. The method of claim 6, further comprising:

in conjunction with setting the order property in the third file section to define the order of the third file section relative to the first and second file sections, updating the order property in one or both of the first and second file sections.

8. The method of claim 1, wherein the first and second file sections each include a content property that defines textual content of the first and second document sections respectively.

9. The method of claim 8, wherein the first and second documents sections are paragraphs.

10. The method of claim 8, further comprising:

detecting that the content of the first document section includes a first element; and updating an elements data structure in the single structured data file to include a first element member that defines the first element, the elements data structure being separate from the sections data structure.

11. The method of claim 10, wherein the first element member is defined in the elements data structure as having a type, the type comprising one of a variable element, a party element, a term element, a connected element, a calculated element, a reference element, or a secret element.

12. The method of claim 10, further comprising:

detecting that a value for the first element member has not been defined; and preventing an esignature from being input to the document.

13. The method of claim 10, further comprising:

detecting that a value of an element member does not meet one or more conditions required for including the first document section; and preventing the first document section from being rendered in the document.

14. The method of claim 8, further comprising:

detecting that the content of the first document section includes redlines; and preventing an esignature from being input to the document.

15. The method of claim 1, wherein the second document section is a signature block that includes esignature fields, the method further comprising:

detecting that a first esignature has been input to a first signature field of the signature fields; and storing, internally in the single structured data file, a text-based representation of the first esignature's binary image data.

16. One or more computer storage media storing computer executable instructions which when executed implement a document editor that is configured to perform a method for defining a document, the method comprising:

accessing a single structured data file that includes a sections data structure that stores file sections in a dynamic tree structure forming an arbitrary ordered sequence of sibling nodes, the sections data structure including a plurality of arbitrarily ordered file sections, each file section including an order property that defines an order in which a corresponding document section should be rendered within a document; and rendering a document that includes a plurality of document sections corresponding to the plurality of file sections, the plurality of document sections being ordered based on the order property defined in each of the plurality of file sections.

17. The computer storage media of claim 16, wherein the method further comprises:

detecting that a first document section of the plurality of document sections has been moved within the document; and updating the order property of a first file section corresponding to the first document section.

18. The computer storage media of claim 16, wherein each file section includes a parent property that defines a parent file section for the respective file section, the parent file section being either a root file section or a different file section of the plurality of file sections.

19. A method, implemented by a document editor, for managing a document, the method comprising:

rendering a document that includes a plurality of document sections, each document section being rendered from a corresponding file section defined in a single structured data file, a first document section of the plurality of document sections corresponding to a first file section that defines a signature block;

accessing an elements data structure in the single structured data file, the elements data structure defining a plurality of elements that are included in content of the plurality of document sections;

detecting that one or more elements of the plurality of elements in the elements data structure have not been assigned a value; and preventing one or more signature fields in the first document section from receiving an esignature until a value has been assigned to the one or more elements.

20. The method of claim 19, wherein the plurality of elements are defined in the elements data structure as having a type, the type comprising one of a variable element, a party element, a term element, a connected element, a calculated element, a reference element, or a secret element.

\*   \*   \*   \*   \*